(12) United States Patent
Kumar et al.

(10) Patent No.: US 8,867,560 B2
(45) Date of Patent: Oct. 21, 2014

(54) MANAGING CROSSBAR OVERSUBSCRIPTION

(75) Inventors: Lalit Kumar, Fremont, CA (US); Deepak Mayya, Fremont, CA (US); Amit Singh, Fremon, CA (US); Rajesh L G, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 13/561,921

(22) Filed: Jul. 30, 2012

(65) Prior Publication Data

US 2014/0029627 A1 Jan. 30, 2014

(51) Int. Cl.
*H04L 12/28* (2006.01)
*H04L 12/935* (2013.01)
*H04L 12/825* (2013.01)
*H04L 12/815* (2013.01)

(52) U.S. Cl.
CPC ............... *H04L 47/22* (2013.01); *H04L 49/30* (2013.01); *H04L 47/25* (2013.01)
USPC ......................................... 370/419; 370/235

(58) Field of Classification Search
CPC ............................... H04L 47/00; H04L 49/00
USPC .......................................... 370/412–419, 235
See application file for complete search history.

(56) References Cited

U.S. PATENT DOCUMENTS

| | | | | |
|---|---|---|---|---|
| 5,867,663 | A * | 2/1999 | McClure et al. | 709/234 |
| 6,067,301 | A * | 5/2000 | Aatresh | 370/418 |
| 6,696,917 | B1 * | 2/2004 | Heitner et al. | 340/2.22 |
| 7,218,608 | B1 * | 5/2007 | Fang et al. | 370/229 |
| 2002/0176358 | A1 * | 11/2002 | Assa et al. | 370/229 |
| 2005/0018601 | A1 * | 1/2005 | Kalkunte et al. | 370/229 |
| 2006/0203721 | A1 * | 9/2006 | Hsieh et al. | 370/229 |
| 2008/0117813 | A1 * | 5/2008 | Hwang et al. | 370/230 |
| 2011/0110241 | A1 * | 5/2011 | Atkinson et al. | 370/242 |
| 2013/0054737 | A1 * | 2/2013 | Miranda et al. | 709/217 |
| 2013/0089094 | A1 * | 4/2013 | Csaszar et al. | 370/390 |

* cited by examiner

*Primary Examiner* — Andrew Lai
*Assistant Examiner* — Sumitra Ganguly
(74) *Attorney, Agent, or Firm* — Edwards Wildman Palmer LLP; James M. Behmke; Stephen D. LeBarron (57) ABSTRACT

A number of ports are configured in a linecard in a network device as dedicated ports and a remaining number of ports as shared ports. A total bandwidth allocated to the dedicated ports is computed. It is determined that available bandwidth at a central crossbar is greater than the total bandwidth allocated to the dedicated ports. The total data sent the central crossbar is rate limited to less than the available bandwidth at the central crossbar. First data associated with the dedicated ports is scheduled to the central crossbar using a first priority. Second data associated with the shared ports is scheduled using a second priority. A shared port data is scheduled based on a ration of a bandwidth requirement for the shared port as a fraction of overall bandwidth requirement for the shared ports.

25 Claims, 4 Drawing Sheets

MANAGING CROSSBAR OVERSUBSCRIPTION

TECHNICAL FIELD

The following disclosure relates generally to managing oversubscription in switching crossbars.

BACKGROUND

A network switch may have multiple linecards. Some ports in each linecard may be dedicated for handling specific data flows, for example, data associated with mission-critical applications, while other ports in a linecard may be shared among non-critical applications. Typically, the data flows are switched between ingress and egress ports in different linecards by a switching crossbar.

DESCRIPTION OF EXAMPLE EMBODIMENTS

Overview

In a general aspect, a number of ports are configured in a linecard in a network device as dedicated ports. A remaining number of ports are configured as shared ports. The dedicated ports receive guaranteed bandwidth and low latency, while the shared ports receive bandwidth remaining after bandwidth is consumed by the dedicated ports. A total bandwidth allocated to the dedicated ports is computed. It is determined that available bandwidth at a central crossbar is greater than the total bandwidth allocated to the dedicated ports. The total data sent the central crossbar is rate limited such that a total bandwidth for the total data is less than the available bandwidth at the central crossbar.

First data associated with the dedicated ports is scheduled to the central crossbar using a first priority. Second data associated with the shared ports is scheduled to the central crossbar using a second priority such that data associated with a shared port is scheduled based on a ratio of a bandwidth requirement for the shared port as a fraction of overall bandwidth requirement for the shared ports.

The details of one or more aspects of the subject matter described in this specification are set forth in the accompanying drawings and the description below. Other potential features and aspects of the subject matter will become apparent from the description, the drawings, and the claims.

DETAILED DESCRIPTION OF EXAMPLE EMBODIMENTS

A communications network typically includes switching systems for moving data between different sections of the network. In this context, a switching system may be a network switch or a collection of network switches that collaborate for performing specific operations. For example, a network switch or a collection of network switches may receive data from network devices, such as servers, end-user computers, routers or other switches, in one portion of a network, and forward the data to network nodes in a different portion of the network. The data may be received in the form of frames (for example, link layer frames such as Ethernet frames) or packets (for example, network packets such as Internet Protocol packets) or as some other suitable protocol data unit.

A switching system, such as a switch described previously, may include multiple linecards. Each linecard is a piece of hardware that includes a set of ports and forwarding logic implemented in the linecard for data forwarding. In some implementations, a linecard may have a form factor of a printed circuit board that fits into slots in a chassis of a switch, and couples to circuitry in the backplane of the switch chassis.

The linecard ports include ingress ports for data, for example, medium access control (MAC) or link layer frames, incoming into the linecard from network devices that are connected to the linecard using the ingress ports, and egress ports for data outgoing from the linecard to other network devices that are connected to the linecard on the egress ports. The forwarding logic may be implemented using application specific integrated circuits (ASICs), which include forwarding units that are coupled to the ports. The linecard may include one or more processors and memory units. The forwarding logic may include a set of instructions that are programmed in the ASICs, or stored in the memory units, or both. The processors may be configured for implementing the set of set of instructions and thereby controlling the forwarding units for switching data between the ingress ports and the egress ports.

In some implementations, the data are switched between ports of a linecard, or between different linecards, using a central crossbar in the switching system that is in the backplane of the linecards. For example, servers in a data center may be interconnected by a switching system that includes linecards inserted into slots in a chassis mounted on a rack. Each linecard has ingress and egress ports on the front panel of the linecard. The ports in the linecards are switched using a central crossbar in the switching system. The central crossbar is built into the chassis and it interconnects the linecards in the backplane of the switching system.

In some implementations, the central crossbar in a switching system may get oversubscribed in relation to a linecard if the aggregate bandwidth for all front panel ports of the linecard is greater than the total bandwidth available on the backplane of the linecard connecting the linecard to the central crossbar. In such an event, the traffic profile of data, for example, MAC frames, which arrive at the ingress ports of the linecard may get changed during switching at the backplane at the point of oversubscription. Mechanisms may be implemented for managing the oversubscription at the crossbar. This may help in preserving priority of the traffic profile.

Figure 1:
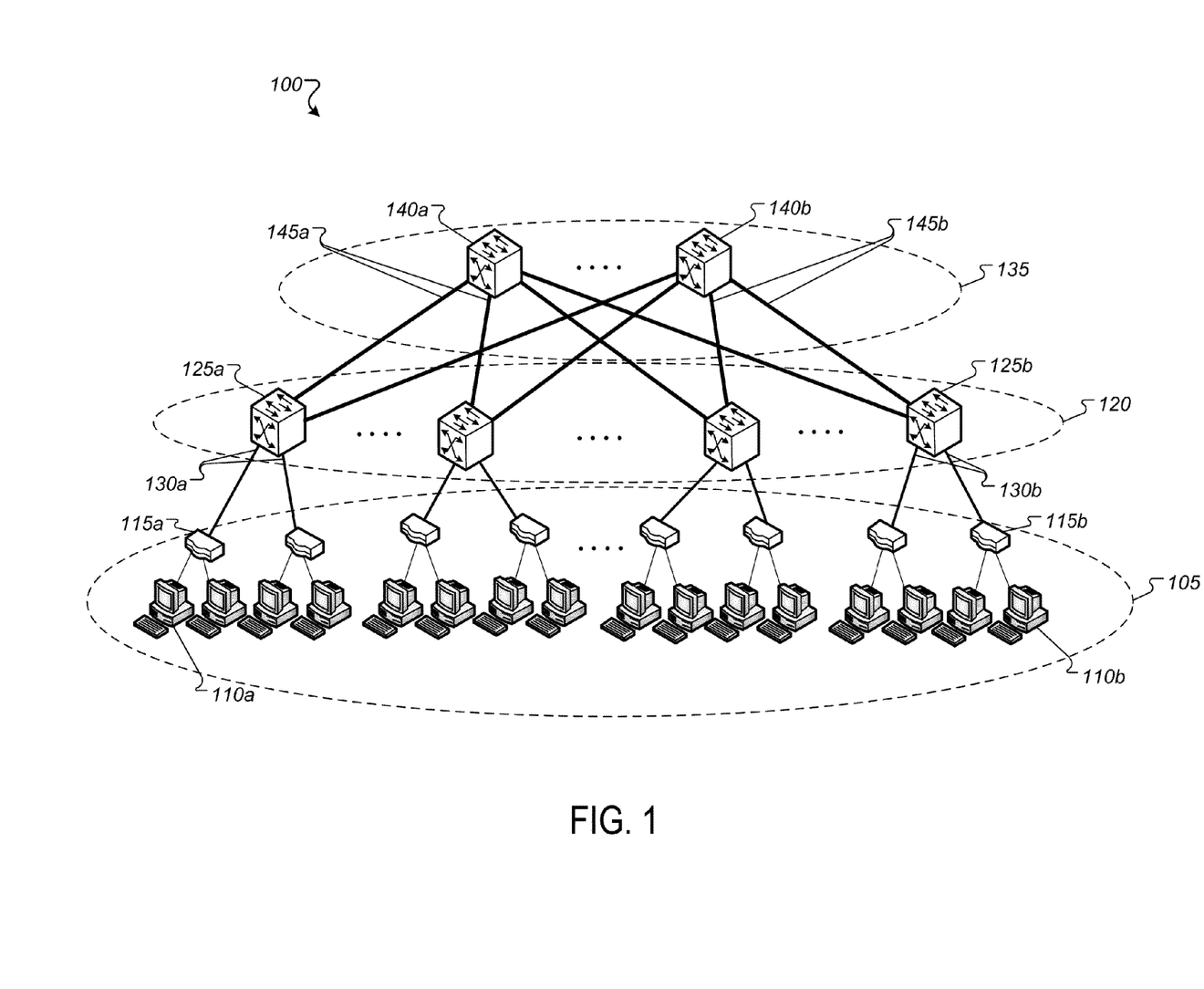
FIG. 1 illustrates an example of a communications system that may be used for allocating bandwidth for shared and dedicated ports in crossbars.

FIG. 1 illustrates an example of a communications system 100 that may be used for allocating bandwidth for shared and dedicated ports in crossbars. The communications system 100 includes an edge network 105 with terminal devices 110a and 110b, and access nodes 115a and 115b. In addition, communications system 100 includes aggregation network 120 with switches 125a and 125b that are coupled to the access nodes using connections 130a and 135b respectively. Communications system 100 also includes core network 135 with switches 140*a* and 140*b* that are coupled to the aggregation network switches via connections 145*a* and 145*b* respectively.

The edge network 105 includes devices that are at the edge or periphery of the communications system 100 (for example, terminal devices 110*a* and 110*b*) and the network nodes that connect the edge devices to nodes in the aggregation network, such as access nodes 115*a* and 115*b*. For example, the edge network 105 may be a local area network (LAN) in a home. As another example, edge network 105 may be an office LAN that connects employee terminal devices, servers, network printers and the like in one office location to the larger office network interconnecting all office locations. The communications system 100 may include one or more edge networks 105.

Each terminal device, such as 110*a* or 110*b*, may be a server, a network workstation, a desktop or laptop or tablet computer, a smart phone, an e-book reader, a networked music player, or any other appropriate portable or stationary computing device. Each terminal device may include one or more processors configured to execute instructions stored by a computer readable medium for performing various operations, such as input/output, communication, data processing, and the like.

Each terminal device includes one or more network interfaces through which it can establish wireless or wired connections to one or more access devices, such as access devices 115*a* or 115*b*. Each terminal device runs applications, for example, networked applications such as a web server or a web browser, using which the terminal device can establish network connections with other network devices through the communications system 100. For example, terminal device 110*a* may establish a network connection with terminal device 100*b* as follows.

Terminal device 110*a* is connected to the access device 115*a*, which connects the terminal device to switch 125*a* in the aggregation network via connection 130*a*. The data from the terminal device 110*a* is forwarded by the switch 125*a* to one of switches 140*a* and 140*b* in the core network 135 via connection 145*a*. The core network switch receiving the terminal device 110*a* data switches the data out on the egress port that connects the core network switch to switch 125*b* in the aggregation network 120. Switch 125*b* forwards the data out to access node 115*b* in the edge network 105 via connection 130*b*. The data is then forwarded by the access node to the destination terminal device 110*b*.

Each access node, such as 115*a* or 115*b*, may be a router, an access point, a gateway server, a switch, or any other appropriate portable or stationary networking device. Each access node may include one or more processors configured to execute instructions stored by a computer readable medium for performing various client operations, such as input/output, communication, data processing, and the like. Each access node includes one or more network interfaces through which it can communicate with terminal devices, for example, 110*a* or 110*b*, and with the aggregation network 120. The communication by an access node may be wired or wireless communication. Each access node is configured for acting as a gateway between terminal devices in the edge network and the larger aggregation network.

The aggregation network 120 acts as an interface between the core network 135 and the edge network 105. The aggregation network includes switches, such as 125*a* and 125*b*, that forward data from terminal devices in the edge network to switches in the core network. The aggregation network switches also forward data from switches in the core network to terminal devices in the edge network via the access nodes.

For example, the aggregation network 120 may be included in a data center and is configured to forward data between terminal devices in the edge network and the core network, which also may be part of the data center. As another example, the aggregation network 120 may be a wide area network (WAN) that interconnects employee terminal devices, servers, network printers and the like located in various office LANs in different office locations.

Each switch in the aggregation network 120, such as 125*a* or 125*b*, is a network switch that aggregates data from terminal devices in the edge networks and forwards the aggregated data to the core network 135. In some implementations, each aggregation switch may be connected to terminal devices through access nodes, such as 115*a* or 115*b*. In other implementations, an aggregation switch may be directly connected to terminal devices.

Each aggregation switch may be a MAC or link layer switch that is configured to read link layer data, for example, Ethernet frame headers. In some implementations, each aggregation switch may be configured to read network or higher layer data, such as Internet Protocol (IP) packets or Transmission Control Protocol (TCP) segments.

An aggregation switch may include both dedicated ports and shared ports that connect the aggregation switch to the access nodes. On the backend, the aggregation switch may be connected to the core network switches using dedicated ports. However, in some implementations, the connection between an aggregation switch and a core network switch may include both dedicated and shared ports.

In this context, a dedicated port is a port in a switch that is configured for forwarding data at its full rate capability, for example, at the advertised line rate with low latency. As a front panel port in a switch, a dedicated port may be configured for "full rate mode" performance. Resources in the switch are suitably allocated to enable a dedicated port to achieve line rate performance. Dedicated ports can be used to cross connect multiple data centers and forward traffic for mission critical applications and services, among other uses.

A shared port is a port in a switch that is configured for forwarding data using the bandwidth that is remaining after allocation to dedicated ports. Typically, shared ports forward data at rates that are lower than the advertised line rate. Data forwarded by shared ports also may be subject to high latency. However, shared ports may perform at the line rate in the absence of traffic for dedicated ports on the same switch. As a front panel port in a switch, a shared port may be configured for "over subscription mode" performance. In the case of shared ports, resources in the switch are allocated to maximize port density and achieve up to line rate performance when resources are available, that is, when the internal fabric of the switch is not used by dedicated ports. Shared ports can be used for forwarding traffic for applications and services that can withstand some delay and for connecting network devices in the aggregation or edge networks, among other uses.

The core network 135 performs the core switching in the communications system 100. The core network receives data from network devices in an aggregation network and switches the data to other network devices, which may be in other aggregation networks or in a physically disjoint section of the source aggregation network. The core network includes core switches, such as 140*a* and 140*b*, which switch data between aggregation switches such as 125*a* and 125*b*. For example, the core network may be the backend or core portion in a data center that includes one or more aggregation networks 120.

Each switch in the core network 135, such as 140*a* or 140*b*, is a network switch that switches bulk data received from the aggregation switches. The connections between the core network switches and aggregation switches, such as 145a or 145b, may be dedicated connections with high bandwidth.

Each core network switch may be a MAC or link layer switch that is configured to read link layer data, for example, Ethernet frame headers. In some implementations, each core network switch may be configured to read network or higher layer data, such as Internet Protocol (IP) packets or Transmission Control Protocol (TCP) segments.

A core network switch may include dedicated ports that connect to one or more aggregation switches. However, in some implementations, a core network switch may include both dedicated and shared ports connecting the core network switch to aggregation switches.

Each of the edge network 105, the aggregation network 120 and the core network 135 may include a packet-switched data network, a circuit-switched data network, or any other network able to carry data, for example, Internet Protocol (IP)-based or asynchronous transfer mode (ATM)-based networks, including wired or wireless networks. The edge network 105, the aggregation network 120 and the core network 135 may be configured to handle web traffic such as hypertext transfer protocol (HTTP) traffic and hypertext markup language (HTML) traffic, and support security and control messages such as authentication using Extensible Authentication Protocol (EAP) methods over IEEE 802.11 (Wi-Fi), Online Certificate Status Protocol (OCSP) messages and Remote Authentication Dial In User Service (RADIUS) messages.

Each of the edge network 105, the aggregation network 120 and the core network 135 106 may include the Internet, wide area networks (WANs), local area networks (LANs), data center networks, wired and wireless networks (for example, Wi-Fi networks, Ethernet networks, Public Switched Telephone Network (PSTN), Integrated Services Digital Network (ISDN), and Digital Subscriber Line (xDSL)), Third Generation (3G) or Fourth Generation (4G) mobile telecommunications networks, private networks such as an intranet, radio, television, cable, satellite networks, and/or any other delivery or tunneling mechanism for carrying data, or any appropriate combination of such networks.

As described previously, the aggregation switches 125a or 125b may receive data traffic from multiple terminal devices through the access nodes. Some of the traffic may be for critical applications, while other traffic may be for less sensitive applications. The switches 125a or 125b may be configured to forward the critical traffic using dedicated ports, white the other traffic may be forwarded using shared ports. The aggregation switches forward the traffic, both critical traffic and less sensitive traffic, in bulk to the core network switches.

The traffic reception and forwarding are performed using the linecards that make up the aggregation switches. The connections of a linecard in an aggregation switch to the edge network devices are through ports on the front panel of the linecard, while the connections to the core network are through the backplane of the linecard, via the central crossbar of the switch. The central crossbar in an aggregation switch may be oversubscribed if the aggregate bandwidth of the front panel ports of a linecard in the switch is greater than the total bandwidth of the central crossbar in the backplane of the switch. For example, the total network bandwidth for the connections (such as 130a or 130b) between the linecard and the access nodes may be greater than the bandwidth of the connections (such as 145a or 145b) between the linecard and the core network switches.

The linecard may manage the bandwidth oversubscription at the central crossbar by rate limiting the traffic from the higher bandwidth of the edge network connections, to the lower bandwidth of the core network connections, while forwarding bulk traffic to the core network. At the same time, the linecard may schedule the data such that priority is maintained for the critical traffic received on the dedicated ports over the non-sensitive traffic received on the shared ports. Similar priority may be maintained by the linecard while receiving traffic from the core network for forwarding to the access nodes. The mechanism for maintaining the traffic priority based on dedicated and shared ports, while rate limiting the traffic is described in greater detail in the following sections.

By maintaining traffic scheduling at both the ingress ports and the egress ports while rate limiting the traffic, the linecards may provide end-to-end performance guarantees for the critical traffic received on the dedicated ports. In this manner, the linecards may guarantee bandwidth for the dedicated ports and ensure that traffic on the dedicated ports experience low latency.

By implementing the aforementioned mechanisms for handling crossbar oversubscription, a linecard may be able to handle a larger number of dedicated and shared ports with an aggregate bandwidth that is greater than the bandwidth on the backplane of the switch. Therefore, crossbar oversubscription may help in achieving better port density. In addition, by combining dedicated and shared ports in the linecards, a switch may provide architectural flexibility to support diverse business and application needs and in the process, reduce total cost of ownership.

Figure 2:
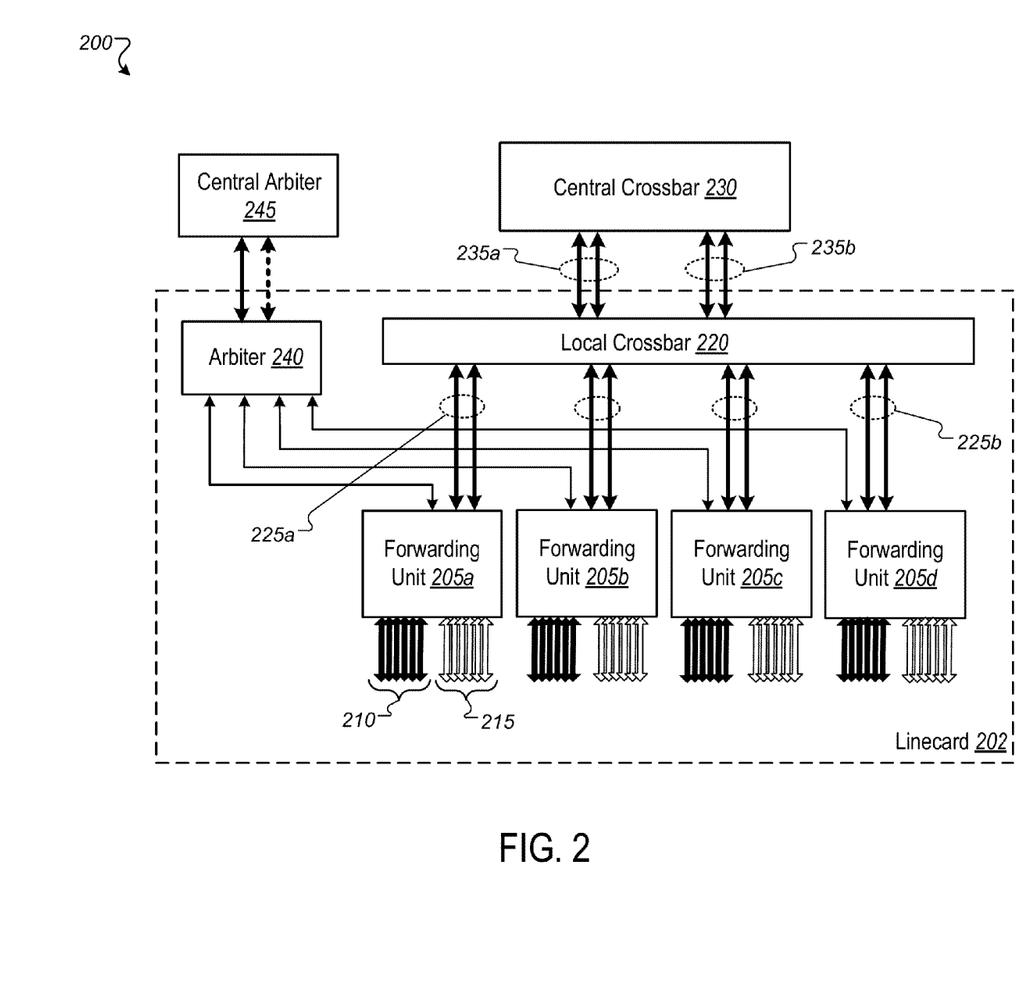
FIG. 2 illustrates an exemplary switching system that may be used for managing bandwidth oversubscription in a central crossbar.

FIG. 2 illustrates an exemplary switching system 200 that may be used for managing bandwidth oversubscription in a central crossbar. The switching system 200 includes a linecard 202, a central crossbar 230 and a central arbiter 245. The linecard 202 includes forwarding units 205a, 205b, 205c and 205d, a local crossbar 220 and an arbiter 240. Each forwarding unit includes dedicated ports 210 and shared ports 215. The forwarding units are connected to the local crossbar 220 through connections 225a and 225b. The local crossbar 220 is connected to the central crossbar 230 through connections 235a and 235b.

The switching system 200 may be similar to the aggregation switches 125a or 125b. Although only one linecard 202 is shown, the switching system 200 may include multiple linecards. The central crossbar 230 and the central arbiter 245 are shared between the different linecards in the switching system 200.

Each of the forwarding units 205a-205d implements forwarding logic for forwarding data traffic from the ingress ports to the central crossbar in the backplane, and forwarding switched data traffic received from the central crossbar to destination devices through egress ports. In some implementations, a forwarding unit is implemented in an ASIC in the linecard 202. In other implementations, a forwarding unit may be implemented as a set of instructions in non-transitory memory in the linecard. Even though only four forwarding units are shown, linecard 202 may include a different number of forwarding units that may be greater than or less than four.

Each forwarding unit includes a set of ports. Some of the ports are configured as dedicated ports 210, while the other ports are configured are shared ports 215. The ports that are configured as dedicated ports, or as shared ports, may be based on user-selected parameters. For example, the switching system 200 may include a user interface that is stored in non-transitory memory associated with the switching system.

The user interface may be accessible through a display device that is coupled to the switching system.

A user, for example a network administrator who manages the switching system 200, may be able to set various configuration parameters of the switching system by accessing the user interface through the display. In some implementations, the user interface may be implemented as a command line interface (CLI), while in some other implementations, the user interface may be implemented as a graphical user interface (GUI), or in some other suitable form.

The ability to configure a port as shared or dedicated may be useful in addressing different network requirements. This may allow a network administrator to dedicate bandwidth and low latency to certain devices under oversubscription conditions. For example, the network administrator may attach a storage array to the switching system 200 and be guaranteed bandwidth when needed by the storage array. Otherwise, the bandwidth may be available to other devices connected to the shared ports.

For each forwarding unit in linecard 202, the user may configure some of the ports as dedicated ports and the other ports as shared ports. For example, a forwarding unit may include 48 ports; the user may configure 32 ports as dedicated ports, and the remaining 16 ports as shared ports. Based on the user input, the forwarding unit may configure a port either as a dedicated port or as a shared port. The forwarding logic may be implemented such that it is able to handle the same port either as a dedicated port or as a shared port. However, in some implementations, specific ports may be configured as dedicated ports, and other specific ports may be configured as shared ports.

In some implementations, some of the dedicated ports 210 may be configured as ingress dedicated ports and the other dedicated ports may be configured as egress dedicated ports. Similarly, some of the shared ports 210 may be configured as ingress shared ports and the other shared ports may be configured as egress shared ports. In other implementations, the same ports may act as both ingress and egress ports depending on the direction of traffic flow at a given time.

In some implementations, each of the forwarding units has the same number of ports associated with it. However, in other implementations, the number of ports associated with different forwarding units may be different.

Each forwarding unit in the linecard 202 is connected to the local crossbar 220 in the linecard 202. The local crossbar 220 is a switching fabric that forwards data between the forwarding units in the corresponding linecard and the central crossbar 230 of the switching system 200. The local crossbar 220 includes instructions implemented in an ASIC in the local crossbar for the data forwarding. Alternatively, the local crossbar 220 may include instructions stored in non-transitory memory in the local crossbar, and the instructions are executed by a processor in the local crossbar or in the linecard. In some implementations, the local crossbar is a passive component and the bandwidth allocation between dedicated ports and shared ports is transparent to the local crossbar.

Each forwarding unit has distinct connections to the local crossbar, for example 225a for forwarding unit 205a and 225b for forwarding unit 205d. In some implementations, the different connections 225a and 225b have the some bandwidth, while in other implementations, the different connections may have different bandwidth.

The central crossbar 230 forwards data between various linecards in the switching system 200, by interfacing with the linecards through respective local crossbars 220. The central crossbar implements a switching fabric in the chassis that holds the linecards. The central crossbar includes instructions for the data forwarding that are implemented in an ASIC in the central crossbar. Alternatively, the central crossbar may include instructions stored in a non-transitory memory associated with the central crossbar, and the instructions are executed by a processor in the central crossbar or in the switching system 200.

The local crossbar 220 is connected to the central crossbar 230 through connections 235a and 235b. In some implementations, the connections 235a and 235b have the some bandwidth, while in other implementations, different connections may have different bandwidth.

The arbiter 240 is configured to coordinate data forwarding between ingress and egress ports in the linecard 202. The central arbiter 245 is configured for requesting data forwarding on the egress ports of all linecards. The central arbiter 245 manages data forwarding for the egress ports on a per-port basis. In some implementations, the arbiter 240 is configured to act as an aggregator for forwarding requests. The arbiter 240 schedules the forwarding requests to the arbiter and distributes forwarding grants coming from the arbiter 245 to the forwarding units 205a-205d. In such implementations, the arbiter 240 is used to reduce the connections from the central arbiter 245 to forwarding units 205a-205d. The central arbiter 245 performs the actual arbitration, which manages the data transfer from ingress to egress (on a per port basis).

Bandwidth oversubscription for the central crossbar 230 can happen when the aggregate bandwidth for the ports, and the corresponding aggregate bandwidth for connections from the forwarding units to the local crossbar 220, is greater than the total bandwidth for the connections from the local crossbar 220 to the central crossbar 230. For example, each of the forwarding units 205a-205d may have 12 ports, and the line rate of each port may be 8 gigabits per second (Gbps). Therefore, for linecard 202 with four forwarding units, the aggregate line rate for 48 ports is 8 Gbps*48=384 Gbps, and the total line rate for each forwarding unit is 8 Gbps*12=96 Gbps. To accommodate the line rate for the front panel ports, the connection between a forwarding unit and the local crossbar (for example, 225a or 225b), may have a bandwidth that is at least the total line rate for the front panel ports of the forwarding unit. For example, the bandwidth for the connection from each forwarding unit to the local crossbar may be 111 Gbps. Thus, the aggregate line rate between the four forwarding units and the local crossbar 220 may be 111 Gbps*4=444 Gbps. Therefore, the local crossbar 220 is able to support the full line rate for the front panel ports.

However, each connection between the local crossbar 220 and the central crossbar 230 also may be rated at 111 Gbps, yielding an aggregate bandwidth of 111 Gbps*2=222 Gbps. Consequently, the total bandwidth that the central crossbar 230 is able to support for the linecard 202 is less than the aggregate full line rate of the front panel ports (384 Gbps) for the linecard 202, thereby leading to bandwidth oversubscription at the central crossbar. The oversubscription is at the connection between the local crossbar 220 and the central crossbar 230, since the oversubscription is due to the aggregate bandwidth on the connections 235a and 235b being less than the aggregate line rate bandwidth of the front panel ports. In some implementations, the oversubscription may be considered as happening at the "second stage" in a hierarchical crossbar setup, which includes the local crossbar 220 in the linecard 202 and the central crossbar 230 in the switching system 200. One consequence of the oversubscription is that when ingress traffic is forwarded to the central crossbar for switching, the profile of the traffic may get changed at the point of oversubscription on the connection between the local crossbar and the central crossbar. Change in the traffic profile may be avoided by managing the oversubscription in a manner such that the traffic priority or the profile is preserved at the point of oversubscription.

The linecard 202 manages the oversubscription at the central crossbar using the forwarding logic that is implemented in each forwarding unit 205a-205d. In some implementations, the forwarding logic is similar for all the forwarding units and therefore the management of oversubscription by each forwarding unit is the same, as described in the following section. However, in other implementations, different forwarding units may implement dissimilar forwarding logic and therefore may manage the oversubscription in different manners.

A forwarding unit, for example any one of 205a-205d, assigns some of the front panel ports associated with the forwarding unit as dedicated ports 210, and the remaining front panel ports associated with the forwarding unit as shared ports 215. As mentioned previously, allocation of ports as dedicated or shared may be based on a configuration by the user of the switching system 200. The user may configure some of the ports as dedicated ports if low latency, guaranteed bandwidth is expected for traffic coming in on that port or going out of that port.

The forwarding unit determines the total crossbar bandwidth, that is, the total bandwidth of the connections from the local crossbar to the central crossbar. In addition, the forwarding unit determines the total bandwidth of the dedicated ports. The forwarding unit checks that the total crossbar bandwidth is at least slightly greater than total bandwidth of the dedicated ports. The check ensures that a certain minimum bandwidth is available to the shared ports in the connection from the local crossbar to the central crossbar. If this condition is not met, that is, total crossbar bandwidth is less than total bandwidth of the dedicated ports, the forwarding unit may generate an error during configuration of the ports by the user.

The forwarding unit configures logic for rate limiters in both ingress and egress directions such that the total rate is greater than the total dedicated port bandwidth but slightly less than the total crossbar bandwidth. The rate limiter limits the total traffic from the dedicated and shared ports such that the bandwidth of the consolidated single data path going into the central crossbar from the local crossbar does not exceed the available bandwidth of the connection between the local crossbar and the central crossbar. The different forwarding units 205a-205d are configured to determine the rate limiter values for each of them based on the total bandwidth available at the central crossbar.

In the ingress direction, the forwarding unit schedules the traffic from dedicated ports to the central crossbar with strict priority, while the traffic from the shared ports is scheduled with a lower priority using weighted scheduling. This ensures that the data packets in the queues associated with the dedicated ports get prioritized over the data packets in the queues associated with the shared ports. In some implementations, the traffic for the shared ports is scheduled using Deficit Weighted Round Robin (DWRR) scheduling, which gives the traffic associated with each shared port a percentage share of the bandwidth that is available to the shared ports. By scheduling the dedicated and shared port traffic in the above manner, the forwarding unit ensures that guaranteed line rate bandwidth is provided to the dedicated ports, while the remaining bandwidth is divided among the shared ports based on their configured speed ratios.

The forwarding unit schedules traffic in the egress direction in a manner similar to the ingress direction traffic. The egress traffic for the dedicated ports is de-queued with strict priority and the remaining bandwidth is given to traffic for the shared ports with DWRR scheduling to share the excess bandwidth in the programmed ratio of their speeds.

The combination of rate limiting and scheduling determines how the buffers in the egress direction are freed up and thereby shapes the egress traffic similar to the ingress traffic. Consequently, guaranteed end-to-end performance with low latency and guaranteed bandwidth is available for traffic on the dedicated ports. In addition, traffic for the shared ports may send at the full line rate if bandwidth is available, for example when the dedicated port traffic are not using their full quota of the bandwidth.

Figure 3:
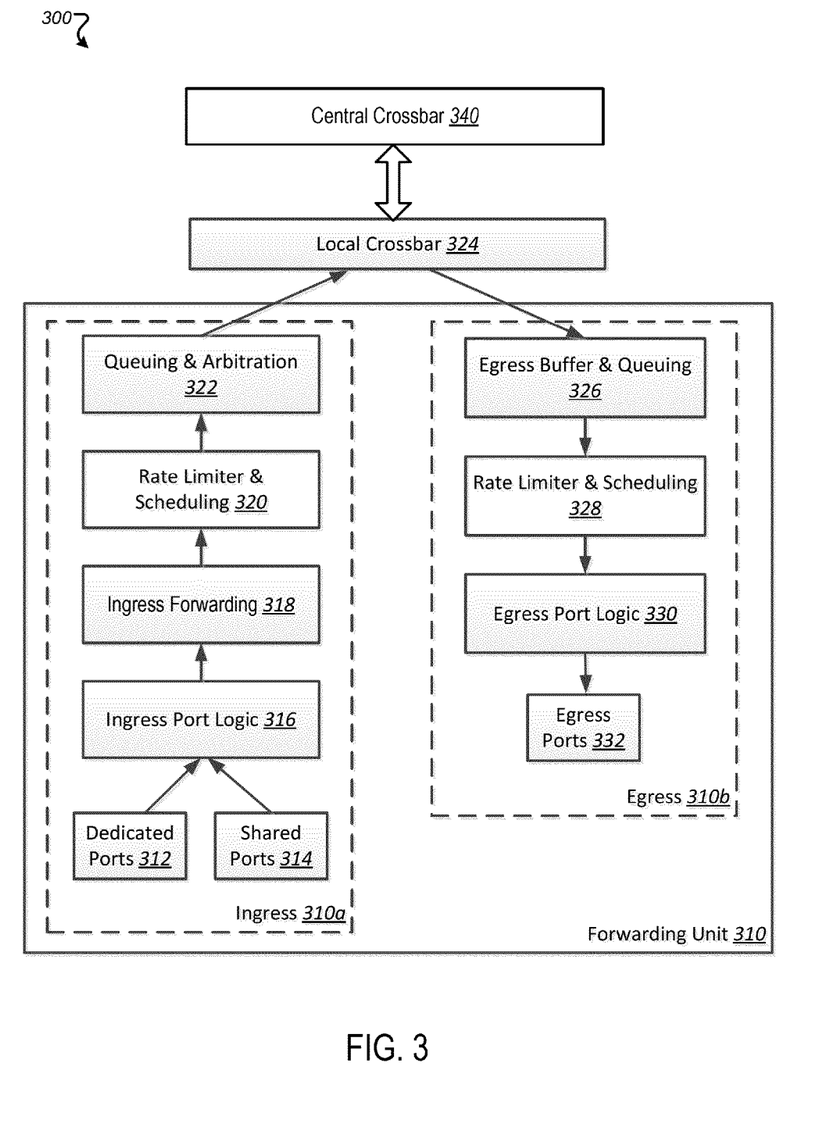
FIG. 3 illustrates an exemplary forwarding unit in a linecard for managing bandwidth oversubscription in a central crossbar.

FIG. 3 illustrates an exemplary forwarding unit 310 in a linecard for managing bandwidth oversubscription in a central crossbar. In addition to forwarding unit 310, FIG. 3 illustrates a local crossbar 324 included in the linecard that includes the forwarding unit 310, and a central crossbar 340 included in the switching system of which the linecard with the forwarding unit 310 is a part. The switching system may be similar to the switching system 200 and the linecard may be similar to the linecard 202, while the central crossbar 340 may be similar to the central crossbar 230. The forwarding unit 310 may be similar to any forwarding unit in the linecard 202, for example, any one of 205a-205d, while the local crossbar 324 may be similar to the local crossbar 220.

The forwarding unit 310 includes an ingress direction logic 310a and egress direction logic 310b. The ingress direction logic includes dedicated ports 312 and shared ports 314. In addition, the ingress direction logic includes ingress port logic module 316, ingress forwarding module 318, rate limiter and scheduling module 320, and queuing and arbitration module 322. The egress direction logic 310b includes egress buffer and queuing module 326, rate limiter and scheduling module 328, egress port logic module 330 and egress ports 332.

The ingress direction logic 3100a handles traffic that flows into the forwarding unit through the dedicated and shared ports, for switching in the backplane using the local crossbar 324 and the central crossbar 340. As described previously, some of the front panel ports of the linecard that are associated with the forwarding unit 310 are allocated as dedicated ports 312, while the remaining front panel ports are allocated as shared ports 314. The allocation may be based on user configuration.

The ingress port logic module 316 includes instructions that are implemented in ASIC in the forwarding unit 310. Alternatively, the instructions may be stored in non-transitory memory associated with the forwarding unit 310 for execution by one or more processors associated with the forwarding unit 310. The ingress port logic module 316 is configured for storing data traffic, such as MAC frames that are arriving via the dedicated and shared ports 312 and 314, in external memory associated with the ports. In some implementations, the ingress port logic module 316 maintains a filter block that has individual queues for every port. The filter block en-queues pointer for each data unit stored in the external memory. In some other implementations, the filter block is associated with the rate limiter and scheduling module 320. In such implementations, data pointers are stored in the filter block and go through rate-limiting and/or scheduling.

The ingress forwarding module 318 includes instructions that are implemented in the ASIC in the forwarding unit 310. Alternatively, the instructions may be stored in non-transitory memory associated with the forwarding unit 310 for execution by one or more processors associated with the forwarding unit 310. The ingress forwarding module 318 is configured for de-queuing the pointers stored by the filter block based on which mode a port is configured (that is, dedicated or shared). The ingress forwarding module 318 forwards the de-queued data unit to the rate limiter and scheduling module 320.

The rate limiter and scheduling module 320 includes instructions that are implemented in the ASIC in the forwarding unit 310. Alternatively, the instructions may be stored in non-transitory memory associated with the forwarding unit 310 for execution by one or more processors associated with the forwarding unit 310. The rate limiter and scheduling module 320 is configured for managing the central crossbar oversubscription in the ingress direction.

The rate limiter and scheduling module 320 allocates bandwidth on the control path from the ingress ports to the local crossbar 324 by strict priority scheduler for the dedicated port queues, and weighted priority scheduler for the shared port queues. The rate limiter and scheduling module 320 also implements a rate limiter between the filter block and a virtual output queue (VOQ) block that is implemented by the queuing and arbitration module 322.

Based on the scheduling and rate limiting functions performed by the rate limiter and scheduling module 320, the dedicated ports 312 are de-queued with the highest priority and the shared ports 314 go through the DWRR scheduling to share the excess bandwidth in the programmed ratio. The overall rate is limited to the available bandwidth at the oversubscribed central crossbar 340.

The queuing and arbitration module 322 includes instructions that are implemented in the ASIC in the forwarding unit 310. Alternatively, the instructions may be stored in non-transitory memory associated with the forwarding unit 310 for execution by one or more processors associated with the forwarding unit 310. The queuing and arbitration module 322 implements the VOQ block, which includes a buffer that queues data pointers associated with data traffic for forwarding to the local crossbar 324. The data is stored in external memory by ingress port logic module 316.

The queuing and arbitration module 322 requests the central arbiter 245 for data transfers. On receiving a grant for performing a data transfer from the central arbiter 245, the queuing and arbitration module 322 fetches the data from the external memory and sends it to the central crossbar 340 through the local crossbar 324. The arbitration ensures that when several queuing and arbitration modules 322 associated with different forwarding units 310 have data destined for the same destination egress buffer and queuing module 326, space is allocated to each data stream before sending the data. This helps to prevent any drops in the data traffic that is forwarded to the same destination egress buffer and queuing module 326.

The egress direction logic 310b handles traffic that flows into the forwarding unit after being processed in the backplane using the local crossbar 324 and the central crossbar 340. The traffic is forwarded through the control path in the egress direction logic 310b to the egress ports 332, and eventually out towards the destination network devices.

The egress buffer and queuing module 326 includes instructions that are implemented in ASIC in the forwarding unit 310. Alternatively, the instructions may be stored in non-transitory memory associated with the forwarding unit 310 for execution by one or more processors associated with the forwarding unit 310. The egress buffer and queuing module 326 implements internal buffers, in which the data (for example, MAC frames) arriving from the local crossbar 324 are stored based on the destination index (DI) and quality of service (QOS) associated with the data.

The rate limiter and scheduling module 328 includes instructions that are implemented in the ASIC in the forwarding unit 310. Alternatively, the instructions may be stored in non-transitory memory associated with the forwarding unit 310 for execution by one or more processors associated with the forwarding unit 310. The rate limiter and scheduling module 328 is configured for managing the central crossbar oversubscription in the egress direction. In some implementations, the rate limiter and scheduling module 328 performs the oversubscription management based on logic that is similar to the logic used by the rate limiter and scheduling module 320 in the ingress direction. However, in other implementations, the rate limiter and scheduling module 328 performs the oversubscription management based on logic that is different from the logic used by the rate limiter and scheduling module 320.

The rate limiter and scheduling module 328 allocates bandwidth on the egress data path by implementing a strict priority scheduler for the dedicated port traffic and weighted priority scheduler for the shared port traffic. In addition, the data rate in the egress direction is programmed to available bandwidth at oversubscribed central crossbar 340.

The egress port logic module 330 includes instructions that are implemented in ASIC in the forwarding unit 310. Alternatively, the instructions may be stored in non-transitory memory associated with the forwarding unit 310 for execution by one or more processors associated with the forwarding unit 310. The egress port logic module 330 is configured for forwarding the data traffic to the egress ports 332. The egress port logic module 330 forwards traffic based on the traffic scheduling managed by the rate limiter and scheduling module 328. The egress port logic module 330 de-queues traffic for the dedicated ports from internal buffers with the highest priority, while shared port traffic is de-queued through weighted scheduling (for example, DWRR scheduling) to share the excess bandwidth in the programmed ratio.

Therefore, by implementing rate limiting and traffic scheduling in both ingress and egress directions per forwarding unit using the modules 320 and 328 respectively, a linecard is able to provide end-to-end performance for mission critical traffic with low latency and bandwidth guarantees. As mentioned previously, the linecard may determine the rate limiter values for each of multiple forwarding units based on the total bandwidth available at the point of oversubscription, that is, the available bandwidth of the central crossbar 340.

Figure 4:
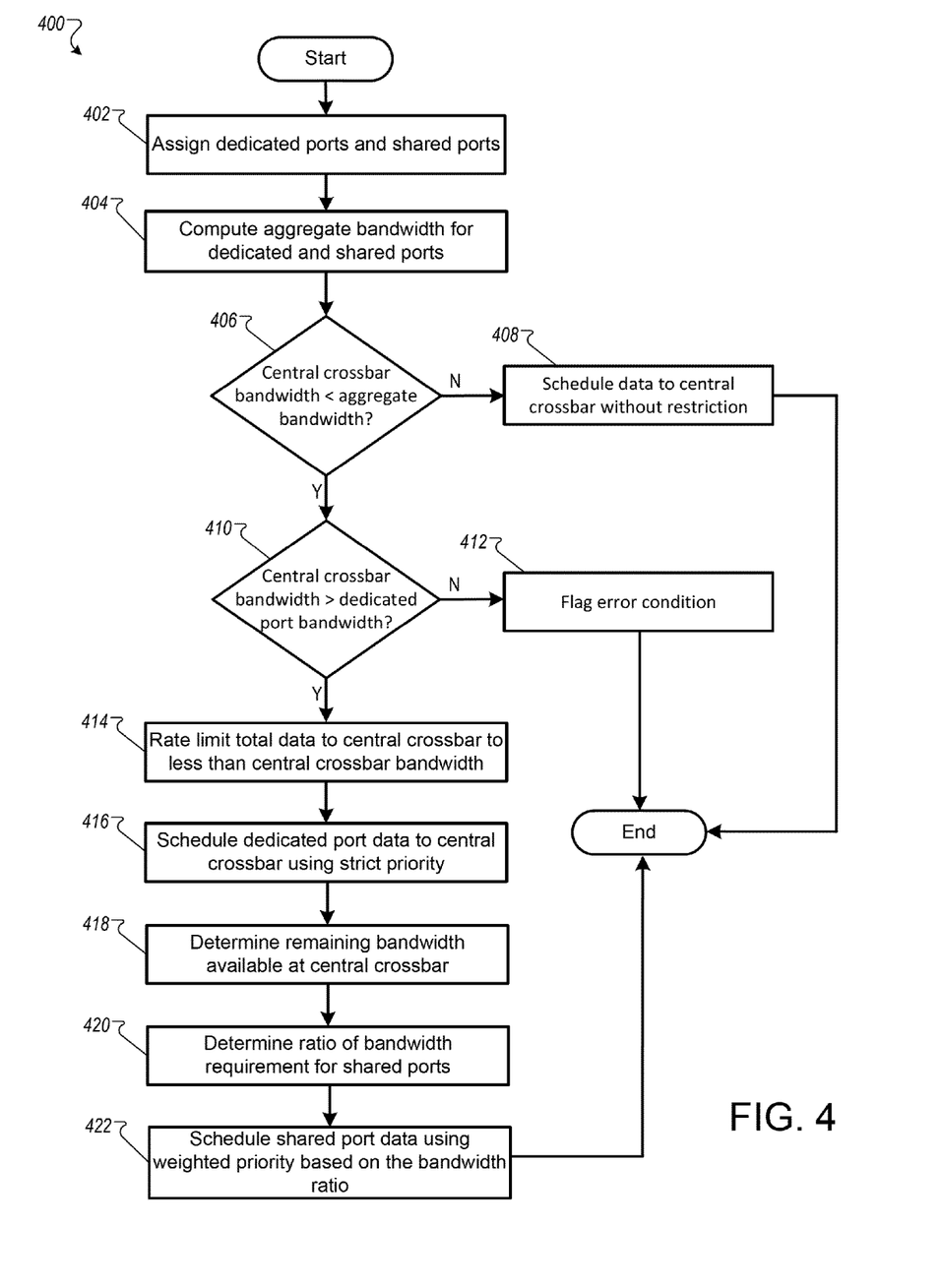
FIG. 4 is a flow chart illustrating an exemplary process for managing bandwidth oversubscription in a central crossbar of a switching system.

FIG. 4 is a flow chart illustrating an exemplary process 400 for managing bandwidth oversubscription in a central crossbar of a switching system. The process 400 may be executed by instructions that are stored in non-transitory machine-readable memory for execution by one or more processors. The process 400 may be performed by a forwarding unit in the linecard 202, such as any of 205a-205d, or by the forwarding unit 310. The following describes the process 400 as being performed by components of the switching system 200. However, the process 400 may be performed by other systems or system configurations.

The process 400 is executed when dedicated ports and shared ports are assigned (402). For example, a forwarding unit such as any one of 205a-205d, assigns some of the front panel ports associated with the forwarding unit as dedicated ports 210, and the remaining front panel ports associated with the forwarding unit as shared ports 215. As mentioned previously, the port assignments as dedicated or shared may be based on a configuration by a network administrator managing the switching system that includes the ports.

The forwarding unit computes the aggregate bandwidth for the dedicated and shared ports (404). The forwarding unit checks whether the central crossbar bandwidth is less than the aggregate bandwidth for the dedicated and shared ports (406).

For example, forwarding unit 205a determines the total bandwidth going in to the central crossbar 230, and then compares the aggregate bandwidth for the dedicated and shared ports to the total bandwidth of the central crossbar 230. In some implementations, the computation of the aggregate bandwidth for the dedicated and shared ports, and the comparison with the central crossbar bandwidth is performed by software logic, for example, by the instructions that are stored in the non-transitory machine-readable memory for execution by the one or more processors.

If it is determined that the central crossbar bandwidth is not less than the aggregate bandwidth for the dedicated and shared ports, that is, the central crossbar bandwidth is at least the same as or greater than the aggregate bandwidth for the dedicated and shared ports, then the forwarding unit schedules data to the central crossbar without restriction (408). For example, this may be the case when the bandwidth available on the backplane of the switching system is sufficiently high that it is able to satisfy the all bandwidth demands of applications and services. In such cases, the forwarding unit may not rate limit the traffic to the central crossbar, or schedule the shared port traffic using weighted scheduling. However, the dedicated port traffic may still be scheduled with strict priority to ensure that the low latency requirements of the traffic are met.

On the other hand, if it is determined that the central crossbar bandwidth is less than the aggregate bandwidth for the dedicated and shared ports, then rate limiting and scheduling may be used to handle the oversubscription at the central crossbar. Upon making such a determination, the forwarding unit checks whether the central crossbar bandwidth is greater than the aggregate bandwidth for the dedicated ports (410). For example, the forwarding unit 205a determines the total bandwidth of the dedicated ports 210. Then the forwarding unit 205a checks that the total crossbar bandwidth is at least slightly greater than total bandwidth of the dedicated ports 210. This check ensures that a certain minimum bandwidth is available to the shared ports in the connection from the local crossbar to the central crossbar.

If it is determined that the central crossbar bandwidth is not greater than the aggregate bandwidth for the dedicated ports, the forwarding unit flags an error condition (412). For example, the forwarding unit may generate an error during configuration by the user such that the user is able to configure a lesser number of the ports as dedicated ports, ensuring that the total bandwidth of the dedicated ports does not generate the error condition.

On the other hand, if it is determined that the central crossbar bandwidth is greater than the aggregate bandwidth for the dedicated ports, the forwarding unit configures logic for rate limiting and scheduling the data traffic in both ingress and egress directions such that the oversubscription is managed while providing end-to-end performance guarantees for the dedicated port traffic. The forwarding unit rate limits the total data to the central crossbar to less than the bandwidth available at the central crossbar (414). For example, the rate limiter and scheduling logic (such as module 320) implemented in the forwarding unit limits the total traffic from the dedicated and shared ports such that the bandwidth of the consolidated single data path going into the central crossbar from the local crossbar does not exceed the available bandwidth of the connection between the local crossbar and the central crossbar.

In addition to rate limiting the total data to the central crossbar, the forwarding unit schedules the dedicated port data to the central crossbar with strict priority (416). To schedule the shared port data using weighted scheduling, the forwarding unit determines the remaining bandwidth available at the central crossbar (418) once the rate-limited dedicated port bandwidth is allocated.

The forwarding unit then determines the ratio of bandwidth requirement for the shared ports (420). For example, the forwarding unit determines the original bandwidth requirement for each of the shared port traffic streams and the combined bandwidth requirement for the shared port traffic. Based on the individual bandwidth requirements for the shared port traffic streams and the combined bandwidth requirement for the shared port traffic, the forwarding unit is able to compute a fraction of the overall shared port traffic for each shared port traffic stream. Then the forwarding unit can allocate a percentage of the remaining bandwidth to each shared port traffic stream proportional to the computed fractions. The forwarding unit then schedules the shared port data to the central crossbar using weighted priority scheduling based on the bandwidth ration (422). For example, the forwarding unit may use DWRR scheduling for the shared port data to the central crossbar, where the weight assigned to each shared port traffic stream is based on the percentage of the remaining bandwidth allocated to each shared port.

The process 400 as described in the preceding sections implements rate limiting and scheduling in the ingress direction. A similar process for rate limiting and scheduling may be implemented in the egress direction for managing the oversubscription at the central crossbar. For example, as described previously, the dedicated port traffic in the egress direction is de-queued from the internal buffers with strict priority and following the rate limits implemented by the rate limit and scheduling module in the egress direction. Any remaining bandwidth is allocated with weighted scheduling (such as DWRR scheduling) to the shared port traffic in the egress direction. The weights assigned to each shared port traffic stream in the egress direction may be based on the percentage of the remaining bandwidth allocated to each shared port by the forwarding unit.

The disclosed and other examples can be implemented as one or more computer program products, that is, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, for example, magnetic, magneto optical disks, or optical disks. However, a computer need not have such devices. Computer readable media suitable for storing computer program instructions and data can include all forms of nonvolatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
configuring, in a linecard in a network device, a number of ports as dedicated ports and a remaining number of ports as shared ports, the dedicated ports receiving guaranteed bandwidth and low latency, the shared ports receiving bandwidth remaining after bandwidth is consumed by the dedicated ports;
computing a total bandwidth allocated to the dedicated ports;
determining that available bandwidth at a central crossbar is greater than the total bandwidth allocated to the dedicated ports;
rate limiting total data sent to the central crossbar such that a total bandwidth corresponding to the total data is less than the available bandwidth at the central crossbar;
scheduling, to the central crossbar, first data associated with the dedicated ports using a first priority; and
scheduling, to the central crossbar, second data associated with the shared ports using a second priority such that data associated with a shared port is scheduled based on a ratio of a bandwidth requirement for the shared port to an overall bandwidth requirement for the shared ports.

2. The method of claim 1, wherein configuring a number of ports as dedicated ports and a remaining number of ports as shared ports comprises:
receiving, from a user, information indicating selection of a number of ports as dedicated ports;
configuring the selected number of ports as dedicated ports based on receiving the information; and
configuring a remaining number of ports as shared ports.

3. The method of claim 2, wherein receiving the information from the user comprises:
receiving the information through a user interface associated with the linecard.

4. The method of claim 1, wherein scheduling to the central crossbar the first data associated with the dedicated ports using a first priority comprises forwarding the first data based on strict priority scheduling.

5. The method of claim 1, wherein scheduling to the central crossbar the second data associated with the shared ports using a second priority comprises:
determining remaining available bandwidth at the central crossbar based on a difference between the total bandwidth at the central crossbar and the bandwidth allocated to the dedicated ports; and
forwarding the second data using weighted priority scheduling, the weights being based on a ratio of the bandwidth requirement for each shared port data to the overall bandwidth requirement for the shared ports.

6. The method of claim 5, wherein the scheduling is based on Deficit Weighted Round Robin (DWRR) scheduling.

7. The method of claim 1, comprising:
receiving, from the central crossbar, data associated with the dedicated ports and the shared ports;
determining first data and second data from the received data;
forwarding the first data to egress ports using strict priority scheduling such that the first data receives guaranteed bandwidth that is rate limited to a fraction of the total bandwidth for the total data; and
forwarding the second data to the egress ports using weighted priority scheduling such that the second data associated with a shared port is forwarded based on a ratio of the bandwidth requirement for the shared port, total bandwidth requirement for the shared ports being scaled to the remaining available bandwidth at the central crossbar.

8. The method of claim 1, wherein rate limiting the total data sent to the central crossbar comprises:
computing an aggregate bandwidth requirement for the dedicated ports and the shared ports;
determining that the available bandwidth at the central crossbar is less than the aggregate bandwidth requirement for the dedicated ports and the shared ports; and based on determining that the available bandwidth at the central crossbar is less than the aggregate bandwidth requirement for the dedicated ports and the shared ports, rate limiting total data sent to the central crossbar such that a total bandwidth for the total data is less than the available bandwidth at the central crossbar.

9. A system comprising:
a central crossbar configured for forwarding data between linecards in a network; and
a linecard including logic stored in a non-transitory machine-readable media-medium and including instructions for execution by one or more processors, which, upon such execution, cause the one or more processors to perform operations comprising:
configuring, in the linecard, a number of ports as dedicated ports and a remaining number of ports as shared ports, the dedicated ports receiving guaranteed bandwidth and low latency, the shared ports receiving bandwidth remaining after bandwidth is consumed by the dedicated ports;
computing a total bandwidth allocated to the dedicated ports;
determining that available bandwidth at a central crossbar is greater than the total bandwidth allocated to the dedicated ports;
rate limiting total data sent to the central crossbar such that a total bandwidth corresponding to the total data is less than the available bandwidth at the central crossbar;
scheduling, to the central crossbar, first data associated with the dedicated ports using a first priority; and
scheduling, to the central crossbar, second data associated with the shared ports using a second priority such that data associated with a shared port is scheduled based on a ratio of a bandwidth requirement for the shared port to an overall bandwidth requirement for the shared ports.

10. The system of claim 9, wherein the instructions for configuring a number of ports as dedicated ports and a remaining number of ports as shared ports include instructions that cause the one or more processors to perform operations comprising:
receiving, from a user, information indicating selection of a number of ports as dedicated ports;
configuring the selected number of ports as dedicated ports based on receiving the information; and
configuring a remaining number of ports as shared ports.

11. The system of claim 10, further comprising a user interface associated with the linecard, and wherein the instructions for receiving the information from the user include instructions that cause the one or more processors to perform operations comprising:
receiving the information through the user interface.

12. The system of claim 9, wherein the central crossbar is configured for forwarding data between linecards.

13. The system of claim 12, wherein the central crossbar includes a plurality of crossbars.

14. The system of claim 9, wherein the linecard includes a local crossbar configured to act as an interface between the dedicated ports and the shared ports and the central crossbar, wherein bandwidth available on a connection between the local crossbar and the central crossbar is less than an aggregate bandwidth requirement for the dedicated ports and the shared ports.

15. The system of claim 9, wherein the instructions for scheduling to the central crossbar the first data associated with the dedicated ports using a first priority include instructions that cause the one or more processors to perform operations comprising:
forwarding the first data based on strict priority scheduling.

16. The system of claim 9, wherein the instructions for scheduling to the central crossbar the second data associated with the shared ports using a second priority include instructions that cause the one or more processors to perform operations comprising:
determining remaining bandwidth at the central crossbar based on a difference between the available bandwidth at the central crossbar and the bandwidth allocated to the dedicated ports; and
forwarding the second data using weighted priority scheduling, the weights being based on a ratio of the bandwidth requirement for each shared port data to the overall bandwidth requirement for the shared ports.

17. The system of claim 16, wherein the scheduling is based on Deficit Weighted Round Robin (DWRR) scheduling.

18. The system of claim 9, wherein the linecard includes Application Specific Integrated Circuits (ASICs), each ASIC being configured for controlling a subset of dedicated ports and shared ports such that each ASIC schedules to the central crossbar the first data associated with respective subset of dedicated ports and second data associated with respective subset of shared ports using rate limiting.

19. The system of claim 18, wherein each ASIC is configured for determining a fraction of the total bandwidth that is available to the ASIC for forwarding data associated with respective subset of dedicated ports and shared ports based on information about dedicated ports and shared ports associated with other ASICs included in the linecard.

20. The system of claim 9, wherein the logic include further instructions for execution by the one or more processors, which, upon such execution, cause the one or more processors to perform operations comprising:
receiving, from the central crossbar, data associated with the dedicated ports and the shared ports;
determining first data and second data from the received data;
forwarding the first data to egress ports using strict priority scheduling such that the first data receives guaranteed bandwidth that is rate limited to a fraction of the total bandwidth for the total data; and
forwarding the second data to the egress ports using weighted priority scheduling such that the second data associated with a shared port is forwarded based on the ratio of the bandwidth requirement for the shared port to the overall bandwidth requirement for the shared ports, total bandwidth requirement for the shared ports being scaled to remaining bandwidth at the central crossbar.

21. A computer program product, embodied in a non-transitory computer-readable medium storing software comprising instructions executable by one or more processors, which, upon such execution, cause the one or more processors to perform operations comprising:
configuring, in a linecard in a network device, a number of ports as dedicated ports and a remaining number of ports as shared ports, the dedicated ports receiving guaranteed bandwidth and low latency, the shared ports receiving bandwidth remaining after bandwidth is consumed by the dedicated ports;
computing a total bandwidth allocated to the dedicated ports;

determining that available bandwidth at a central crossbar is greater than the total bandwidth allocated to the dedicated ports;

rate limiting total data sent the central crossbar such that a total bandwidth corresponding to the total data is less than the available bandwidth at the central crossbar;

scheduling, to the central crossbar, first data associated with the dedicated ports using a first priority; and scheduling, to the central crossbar, second data associated with the shared ports using a second priority such that data associated with a shared port is scheduled based on a ratio of a bandwidth requirement for the shared port to an overall bandwidth requirement for the shared ports.

22. The computer program product of claim 21, wherein the instructions for configuring a number of ports as dedicated ports and a remaining number of ports as shared ports include instructions that cause the one or more processors to perform operations comprising:

receiving, from a user, information indicating selection of a number of ports as dedicated ports;

configuring the selected number of ports as dedicated ports based on receiving the information; and configuring a remaining number of ports as shared ports.

23. The computer program product of claim 21, wherein the instructions for scheduling to the central crossbar the first data associated with the dedicated ports using a first priority include instructions that cause the one or more processors to perform operations comprising:

forwarding the first data based on strict priority scheduling.

24. The computer program product of claim 21, wherein the instructions for scheduling to the central crossbar the second data associated with the shared ports using a second priority include instructions that cause the one or more processors to perform operations comprising:

determining remaining bandwidth at the central crossbar based on a difference between the available bandwidth at the central crossbar and the bandwidth allocated to the dedicated ports; and forwarding the second data using weighted priority scheduling, the weights being based on a ratio of the bandwidth requirement for each shared port data to the overall bandwidth requirement for the shared ports.

25. The computer program product of claim 21, wherein the software includes further instructions executable by the one or more processors, which, upon such execution, cause the one or more processors to perform operations comprising:

receiving, from the central crossbar, data associated with the dedicated ports and the shared ports;

determining first data and second data from the received data;

forwarding the first data to egress ports using strict priority scheduling such that the first data receives guaranteed bandwidth that is rate limited to a fraction of the total bandwidth for the total data; and forwarding the second data to the egress ports using weighted priority scheduling such that the second data associated with a shared port is forwarded based on the ratio of the bandwidth requirement for the shared port, total bandwidth requirement for the shared ports being scaled to remaining bandwidth at the central crossbar.

* * * * *